United States Patent [19]

Yura

[11] Patent Number: 4,966,408

[45] Date of Patent: Oct. 30, 1990

[54] MOTOR VEHICLE

[75] Inventor: Takuya Yura, Gotemba, Japan

[73] Assignee: Yamaha Hatsudoki Kabushiki Kaisha, Iwata, Japan

[21] Appl. No.: 126,047

[22] Filed: Nov. 27, 1987

[30] Foreign Application Priority Data

Nov. 28, 1986 [JP] Japan ................................ 61-282011
Nov. 28, 1986 [JP] Japan ................................ 61-282012

[51] Int. Cl.$^5$ ............................................. B60R 27/00
[52] U.S. Cl. .................................... 296/185; 180/68.4; 180/89.2; 180/903
[58] Field of Search .............. 296/185; 180/68.1, 68.4, 180/296, 309, 903, 291, 89.2; D12/88, 181

[56] References Cited

U.S. PATENT DOCUMENTS

| D. 218,738 | 9/1970 | Moore et al. | D12/88 |
|---|---|---|---|
| D. 221,165 | 7/1971 | Broadley | D12/88 X |
| D. 222,160 | 10/1971 | Rudd | D12/88 X |
| D. 282,729 | 2/1986 | Lunn | D12/88 |
| 2,079,218 | 5/1937 | Ledwinka | 180/291 X |
| 2,529,995 | 2/1948 | Brezek | 180/68.1 |
| 2,731,098 | 1/1956 | Saives | 180/68.1 |
| 3,373,833 | 3/1968 | Sano | 180/291 |
| 3,791,468 | 2/1974 | Bryan, Jr. | 296/1 S X |
| 4,267,895 | 5/1981 | Eggert, Jr. | 180/291 X |
| 4,460,055 | 7/1984 | Steiner | 296/1 S X |
| 4,569,551 | 2/1986 | Rauser et al. | 296/1 S |
| 4,690,204 | 9/1987 | Reichel et al. | 180/68.1 X |

FOREIGN PATENT DOCUMENTS

| 741411 | 6/1944 | Fed. Rep. of Germany | 180/68.1 |
|---|---|---|---|
| 1056949 | 5/1959 | Fed. Rep. of Germany | 180/68.1 |
| 1075582 | 10/1954 | France | 296/1 S |
| 500186 | 11/1954 | Italy | 296/1 S |
| 503639 | 12/1954 | Italy | 180/68.1 |

OTHER PUBLICATIONS

Road and Track Magazine Sep. 1984, p. 72.

Primary Examiner—Margaret A. Focarino
Assistant Examiner—Gary C. Hoge
Attorney, Agent, or Firm—Ernest A. Beutler

[57] ABSTRACT

An improved body configuration for a vehicle having an aerodynamic configuration and defining a pair of longitudinally extending air flow channels at the opposite sides of the body and inwardly of the outer periphery of the fenders for achieving good air flow. A front bridging member is formed that complies with bumper height regulations and forms an aerodynamic device for assisting in the air flow. The engine compartment is defined by a rearwardly opening extractor section for drawing air from the engine compartment and a forwardly extending exhaust system receives the exhaust gases from the engine and discharges them to the atmosphere.

25 Claims, 6 Drawing Sheets

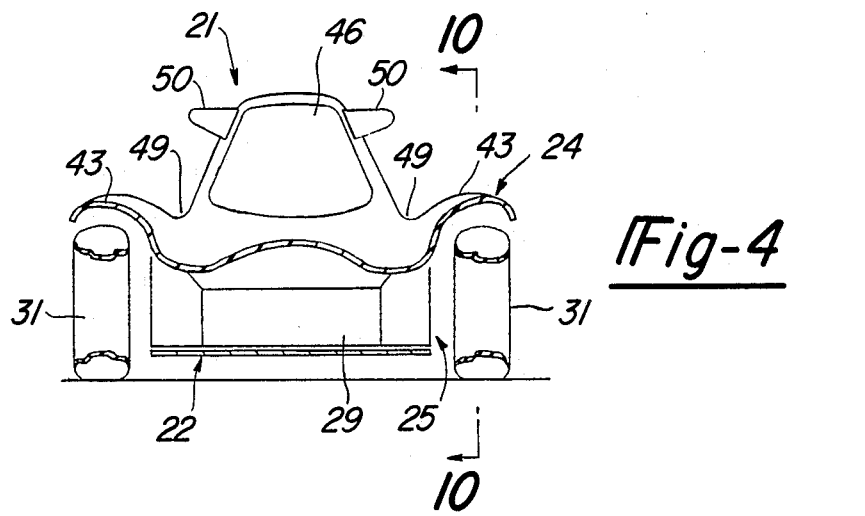
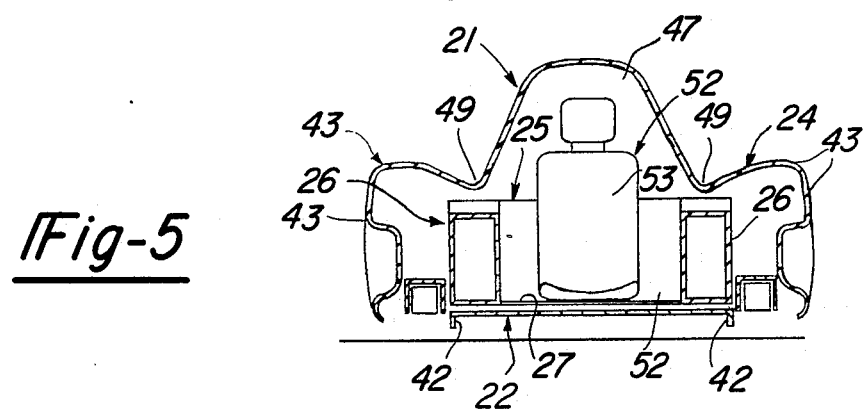
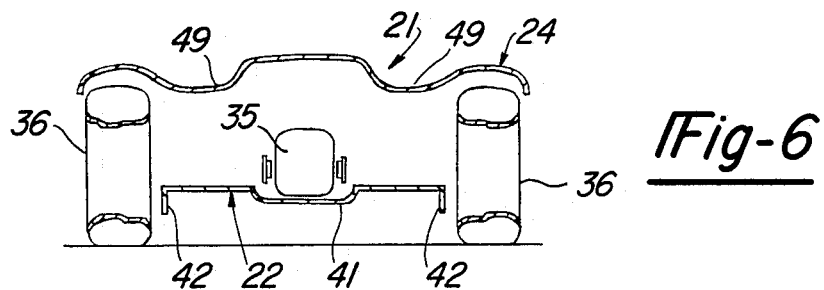

MOTOR VEHICLE

BACKGROUND OF THE INVENTION

This invention relates to a motor vehicle and more particularly to an improved body configuration and component layout for such a vehicle.

The subject of aerodynamics is gaining considerable attention in connection with the design of motor vehicles. With the emphasis on fuel economy, aerodynamic designs are receiving considerable interest. The advantage of a good aerodynamic design is that a vehicle of a given size is capable of being propelled at higher speeds with lower power engines if the aerodynamic configuration is effective. Not only will this have the effect of increasing the speed of the vehicle for a given power output, but it will also result in improved fuel economy for the vehicle. However, when changing the aerodynamic configuration to improve straight ahead performance, it is also important to insure that the vehicle configuration will not adversely affect handling of the vehicle, i.e., changes in direction or directional stability.

It is, therefore, a principal object of this invention to provide an improved body configuration that will improve the aerodynamic efficiency and, at the same time, improve handling.

It is a further object of this invention to provide an improved streamline shape for a motor vehicle that will also assist in improving the handling of the vehicle.

In connection with the design of vehicle bodies, there is more to consider than mere aerodynamics. That is, vehicles that are intended to be operated on the road must comply with certain standards having to do with uniform bumper height, component location and the like. Frequently, these vehicular regulations can affect adversely the handling and aerodynamics of the vehicle.

It is, therefore, a still further object of this invention to provide an improved vehicle configuration which will not only improve the aerodynamic performance of the vehicle but which will also comply with government regulations.

Certain vehicle configurations lend themself to rear engine or mid-engine placement. This type of engine placement is particularly popular and advantageous with single or two-seat vehicles. However, the rearward placement of the engine gives rise to a number of difficulties. In the first instance, when the engine is rearwardly placed, there is the difficulty of insuring the adequate flow of air to the engine both for its cooling and also for its induction system. In addition, the rearward placement of the engine can cause its induction system to be in a position where it may interfere with the rearward vision or, alternatively, adversely affect the aerodynamics in the area of the rear window of the vehicle.

Furthermore, when the engine is placed rearwardly, substantial constraints are placed upon the design of many of the components such as the exhaust system. It is well known that the length of the exhaust system from the exhaust port to the point of discharge to the atmosphere can be critical in obtaining good engine performance. When the engine is rearwardly placed in the vehicle, conventional exhaust systems have substantially restricted the length of the exhaust system.

It is, therefore, a still further object of this invention to provide an improved body configuration and layout for a rear or mid-engine vehicle.

It is yet a further object of this invention to provide an arrangement for a rear engine vehicle wherein adequate air is supplied to the engine.

It is yet a further object of this invention to provide an improved exhaust system for a mid or rear engine vehicle.

SUMMARY OF THE INVENTION

A first feature of this invention is adapted to be embodied in a motor vehicle body for a vehicle having a pair of front wheels and a pair of rear wheels. The body is comprised of a pair of fenders each of which extends generally from the front of the vehicle, over one of the front wheels, over the rear wheel at the respective side, and which terminates at the rear of the vehicle. A central body portion also extends from the front to the rear of the vehicle and defines a front portion, a passenger compartment, an engine compartment and a rear end. In accordance with this feature of the invention, the central body portion is joined to the fenders by joining portions that are concave in transverse cross-section to define a pair of front to rear air flow channels lying below the tops of the fenders.

Another feature of the invention is also adapted to be embodied in a motor vehicle body for a vehicle that has a pair of front wheels and a pair of rear wheels. The body comprises fenders, each of which extends generally from the front to the rear of the vehicle and which overlie the wheels at that side of the vehicle. A central body portion also extends from the front to the rear of the vehicle and defines a front portion, a passenger compartment, and a rear portion and the central body portion is connected to the fenders. In accordance with this feature of the invention, the fenders have a portion at one end of the vehicle which lies below the adjacent part of the central body portion. A bridging section extends between the fenders at this end and lies above the central body portion adjacent part and defines an air gap therebetween.

A still further feature of the invention is also adapted to be embodied in a motor vehicle having a body configured generally as described in the preceding paragraphs and comprised of a pair of front wheels and a pair of rear wheels with pairs of fenders that overlie the front and rear wheels at each side of the vehicle and a central body portion that extends from the front to the rear of the vehicle. In accordance with this feature of the invention, the vehicle is powered by a rearwardly positioned engine that is disposed between the rear wheels and the rear portions of the fenders. In accordance with this feature of the invention, the rear end of the body central portion is defined by a pair of generally parallel extending sections that extend from the front to the rear and which define an extractor opening at the rear end of the vehicle for drawing air from the engine compartment and discharging it rearwardly.

Yet another feature of the invention is also adapted to be embodied in a motor vehicle having a body and a rearwardly positioned engine compartment. In accordance with this feature of the invention, an engine is positioned in the rearwardly positioned engine compartment and has an exhaust system that extends forwardly from the engine to an exhaust treatment device that extends along one side of the vehicle adjacent the passenger compartment and which discharges to the atmosphere in a rearward direction at a point forwardly of the rear wheel.

BRIEF DESCRIPTION OF THE DRAWINGS

FIG. 4 is a cross-sectional view of the vehicle taken along the line 4—4 of FIG. 1.

FIG. 5 is a cross-sectional view taken along the line 5—5 of FIG. 1.

FIG. 6 is a cross-sectional view taken along the line 6—6 of FIG. 1.

DESCRIPTION OF THE PREFERRED EMBODIMENT

Figure 1:
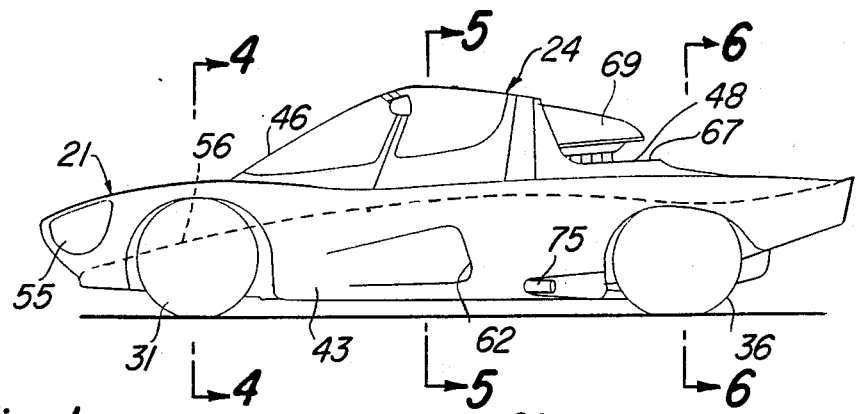
FIG. 1 is a side elevational view of a motor vehicle constructed in accordance with an embodiment of the invention.

A motor vehicle constructed in accordance with an embodiment of the invention is identified generally by the reference numeral 21. The vehicle 21 is, in the illustrated embodiment, of the four wheel, single passenger, rear or mid-engine type. Although the invention is described in conjunction with a vehicle having this configuration and component layout, it is to be understood that certain facets of the invention may be employed in connection with vehicles of other configuration and/or layout. Since the invention is primarily concerned with the configuration of the body of the vehicle 21 and the layout of certain of its components, only those portions of the vehicle will be described in detail since those skilled in the art may readily understand how the principles can be applied to vehicles of other types and also how to apply well known mechanical components to the described construction.

Figure 13:
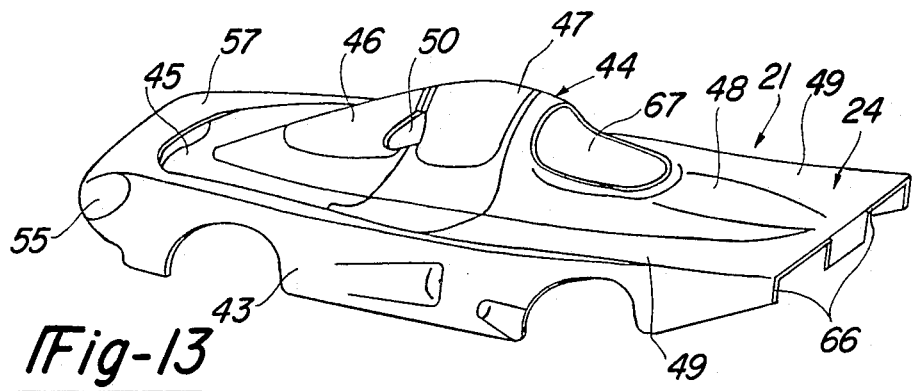
FIG. 13 is a perspective view of the upper portion of the body.

The vehicle 21 is made up of three main sub-components comprised of a belly pan or under tray 22 (FIG. 15), a tub and chassis 23 (FIG. 14) and an upper or main body portion 24 (FIG. 13). The materials from which these main components are formed may be of any of the materials that are normally used in conjunction with vehicles of this general type. For example, fiberglass, aluminum alloys, composite fiber materials and the like may be utilized. Preferably, however, light weight constructions are employed since the main purpose of the vehicle is to provide a vehicle that will have high performance, light weight and extremely good fuel economy. All this is accomplished with an engine of moderate power for the size of the vehicle.

Figure 14:
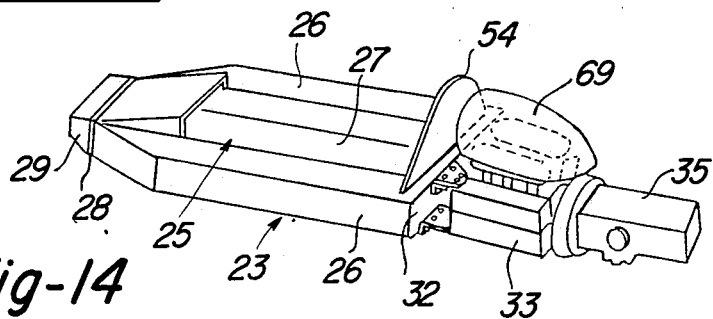
FIG. 14 is a perspective view showing the tub and drive components of the vehicle.

Referring now primarily to FIG. 14, the tub and drive train 23 is comprised of a tub part 25 which may be formed of a composite construction and which has a pair of generally box-shaped side members 26 that define between them a passenger area floor 27. At the front end, the box sections 26 taper inwardly and form an attachment plate 28 to which a more rigid box section 29 is affixed. The box section 29 forms a carrier for the front suspension of the vehicle so as to suspend the front wheels 31. The suspension system for the front wheels 31 may be of any known type. As has been previously noted, these components of the hardware of the vehicle are not necessarily to understand the invention.

A rear bulkhead 32 extends across and is rigidly affixed to the side sections 26 of the tub 25 and carries attachment points for the engine transmission rear suspension assembly. This includes an internal combustion engine indicated generally by the reference numeral 33 which is positioned rearwardly of the passenger compartment defined by the floor 27 and substantially at the midpoint of the vehicle. Although the engine 33 may be of any suitable configuration, in the illustrated embodiment, a V6 engine is depicted which includes a cylinder block 34. A transmission differential assembly 35 is supported at the rear end of the engine 33 and specifically from the cylinder block 34. The transmission differential assembly 35 is driven from the engine output shaft through a clutch and drives a pair of half-shafts (not shown) for driving the vehicle rear wheels 36. A rear suspension system (not shown) suspends the rear wheels 36 from the transmission 35 in any known manner.

Figure 15:
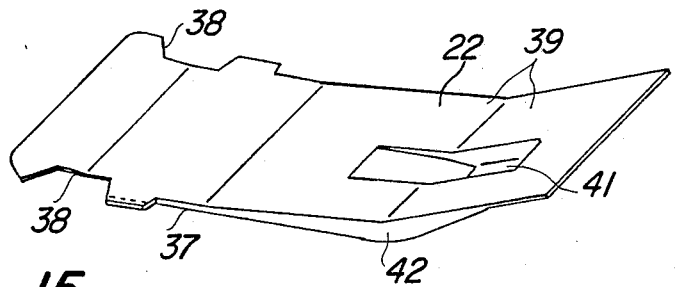
FIG. 15 is a perspective view showing the belly pan or under tray of the body.

The belly pan or tray 22, as has been previously noted, is best shown in FIG. 15 and is comprised of a main generally planar section 37 which underlies the passenger compartment floor pan 27 and the forward portion of the vehicle. Cutouts 38 are provided in the under tray 22 so as to clear the front wheels 31. A generally smooth configuration is desired so as to provide smooth air flow through the area beneath the vehicle 21. At the rear end, the under tray 22 is provided with a pair of inclined sections 39 which extend at angles inclined upwardly toward the rear of the vehicle. A recess 41 is formed in the sections 39 so as to provide clearance for the transmission 35. Extending from the wheel openings 38 rearwardly at the opposite sides of the under tray 22 are a pair of downwardly depending fences or air dams 42 that have the purpose of channeling the air flow from the front to the rear of the vehicle while precluding its escape outwardly from the sides thereof to improve aerodynamics.

The body 24 will now be described by particular reference to FIGS. 1 through 7, 10 and 13. The body 24 is comprised generally of a pair of fenders 43 that extend from the front to the rear of the vehicle 21 and which overlie the front and rear wheels 31, 36 of the vehicle at each side. In addition, there is provided a central body portion, indicated generally by the reference numeral 44 which defines, from front to rear, a front portion 45, a passenger compartment comprised of a windshield 46, roof 47 and an engine compartment 48. The fenders 43 are connected to the central body portion 44 by joining portions 49 which have an important function in the aerodynamics of the vehicle as will be described. Rear view mirrors 50 are carried by the central portion 44 adjacent the windshield 46.

Figure 2:
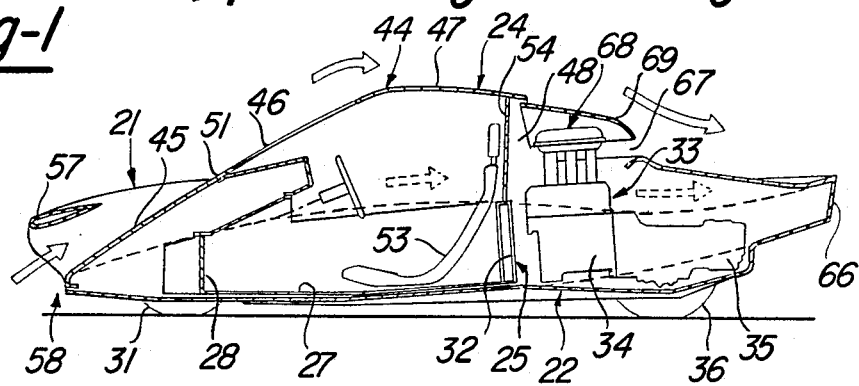
FIG. 2 is a longitudinal cross-sectional view of the vehicle, taken generally along the line 2—2 of FIG. 3.
Figure 3:
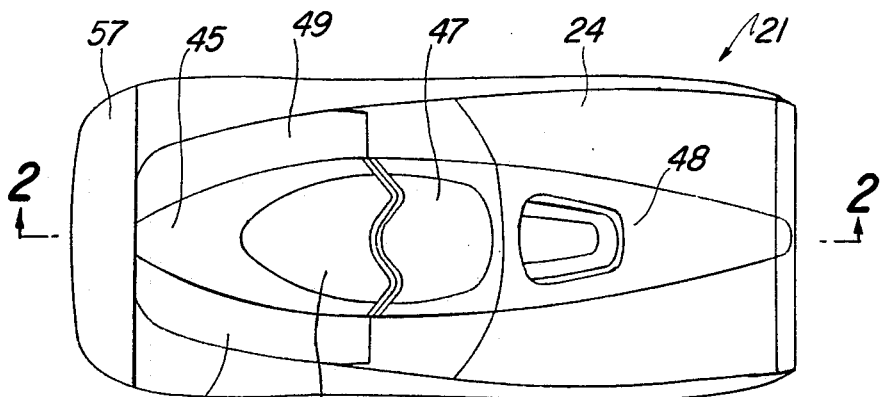
FIG. 3 is a top plan view of the vehicle.
Figure 7:
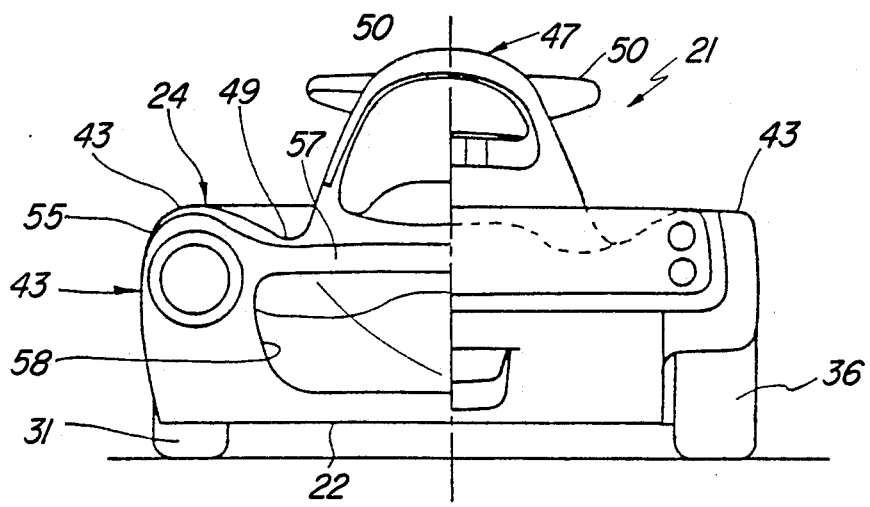
FIG. 7 is a composite view showing the front elevation of one side of the vehicle on the left and the rear elevation of the other side of the vehicle on the right.

As will be seen from FIG. 2, the body 24 also provides a dash or cowling 51 that defines the forward end of the passenger compartment, which, as has been previously noted, is defined also in part by the floor 27 of the tub 23. The passenger compartment is indicated generally by the reference numeral 52 and accommodates a single seat 53 so as to accommodate the driver. As has been previously noted, the vehicle 21 is primarily designed to accommodate a single passenger, although facets of the invention may be employed in connection with vehicles that are adapted to seat more than one passenger. The rear end of the passenger compartment 52 is defined by the bulkhead 32 as well as an upwardly extending bulkhead or firewall 54 that separates the passenger compartment 52 from the engine compartment 48.

It will be noted particularly from FIGS. 1 and 2 that the forward body part 45 extends very steepwardly downwardly and terminates at a substantially lower lever than the upper adjacent portions of the fenders 43. The fenders 43 have a substantially greater height in this area because they must clear the front wheels 31 and also because headlights are mounted in pockets 55 formed in the forward portion of the fenders 43. The headlight pockets 55 must be elevated to comply with governmental regulations regarding the height for forward lighting of vehicles. The joining portions 49 of the body are configured generally concave in shape as may be best seen by the cross-sections FIGS. 4, 5 and 6 and define definite air flow channels that extend between the fenders 43 and central body portion 44 so as to channel the flow of air in longitudinal planes along the body and maintain stability both in forward and turning operations to improve the handling of the vehicle. The lower level of this channel is indicated by the broken lines 56 in FIGS. 1 and 2.

In order to provide an adequate bumper height and to provide means for attachment of the front license plate, if required, and also for aerodynamic purposes, if desired, a bridging section 57 extends between the forward ends of the fenders 43 at the appropriate height. The bridging section 57, as may be best seen in FIGS. 2 and the left hand side view of FIG. 7, defines an air inlet opening 58 through which air is channeled along the portion of the body between the peaks of the fenders 43. As may be seen by the solid line arrows, this air flows over the central body portion 44 and the channeled air flow for the joining sections 49 is defined by the broken line arrows. As a result, good aerodynamic flow along the length of the vehicle is provided and this air is channeled in such a way so as to substantially improve directional stability, as aforenoted.

Figure 8:
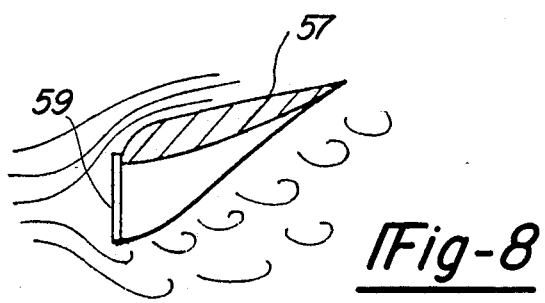
FIG. 8 is a cross-sectional view taken through a front bridging device and showing the aerodynamic problem presented by the license plate mounting.
Figure 9:
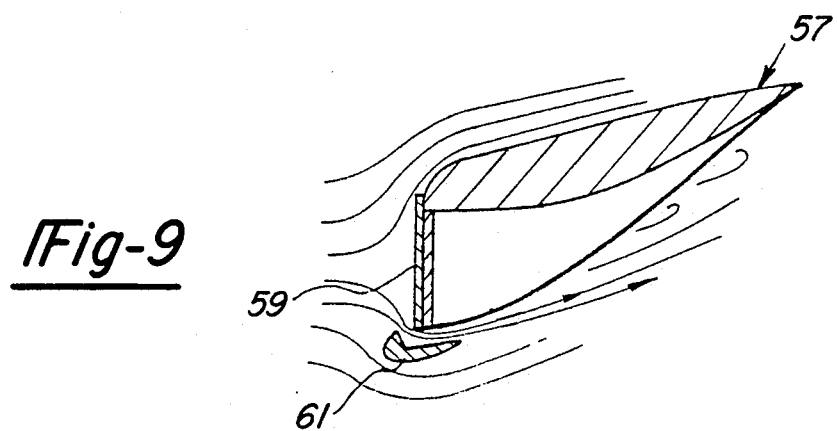
FIG. 9 is a cross-sectional view, in part similar to FIG. 8, showing how this aerodynamic problem is solved.

The bridging section 57 may serve as a means for attachment of a license plate, number plate or the like, indicated by the reference numeral 59 and shown in FIGS. 8 and 9. FIG. 8 shows the construction and air flow across the bridging section 57 under the circumstance when the license plate is merely mounted to it in a normal fashion. It should be noted that a substantial amount of turbulence is generated which causes wind resistance and drag. In order to avoid this, the body 24 is provided with a chin type spoiler 61 (FIG. 9) that borders the lower side of the license plate 59 and which will cause a smoother air flow and reduce the undesirable turbulence. As a result, even though there is a license plate in place, the wind resistance and aerodynamics of the vehicle 21 are not substantially affected in an adverse sense.

Figure 12:
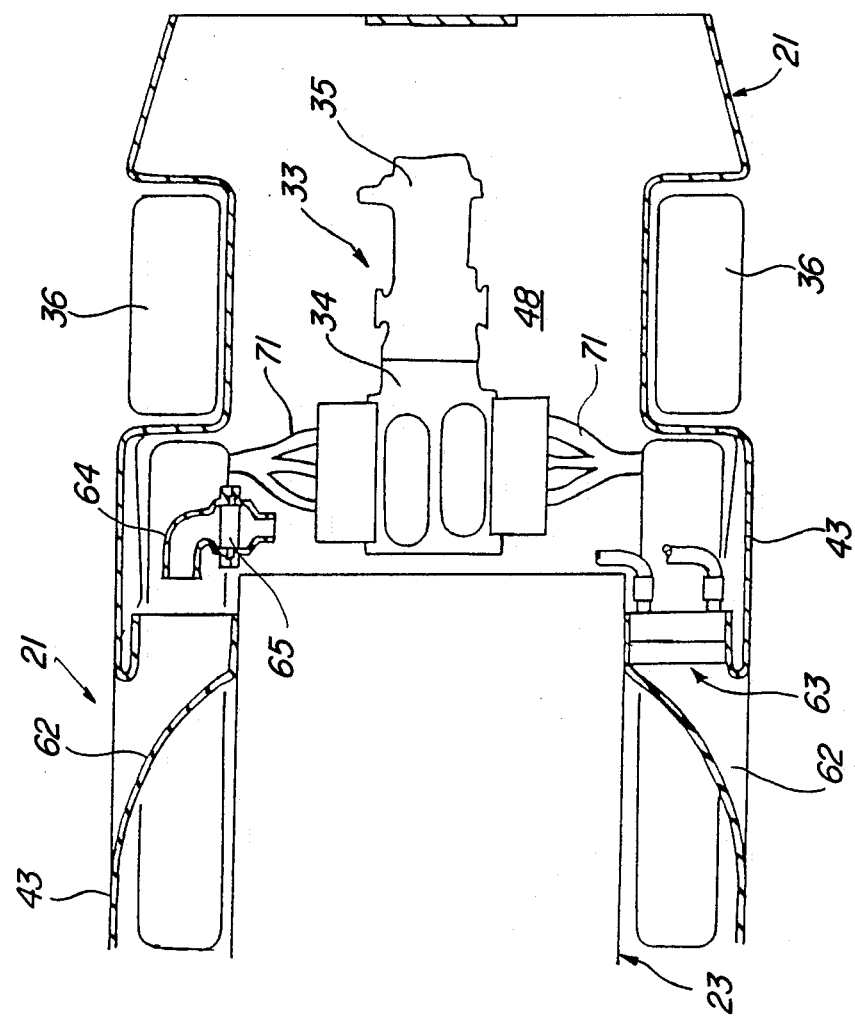
FIG. 12 is a cross-sectional view taken along the line 12—12 of FIG. 10.

An arrangement is provided for introducing cooling and induction air to the engine compartment 48. This system includes a pair of side air inlets 62 (FIGS. 1 and 12) that are configured similarly to an inlet device known as a NASSA duct. The inlets 62 are positioned at the sides of the passenger compartment 52 and open into the interior of the body and communicate at their downstream ends with the engine compartment 48. On one side of the vehicle 21, a cooling radiator 63 is positioned across the air flow passage so as to provide cooling air flow t the radiator 63. The radiator 63 receives coolant from the engine 33 in a known fashion so as to cool the engine 33. The air passing through the radiator 63 is discharged from the engine compartment 48 in a manner to be described.

At the opposite side of the vehicle, the air inlet 62 directs a portion of its cooling air to the engine compartment 48 for general engine cooling and also for providing cool air to the induction system. In this side of the vehicle 21, there is provided further ducting 64 that ducts a portion of the inlet air across a further heat exchanger 65. The heat exchanger 65 may cool the engine lubricant and/or the lubricant of the transmission 35. Either or both of these lubricants are circulated through the heat exchanger 65 through appropriate conduits.

As has been previously noted, the under tray or belly pan is provided with an upwardly tapering section 39 at its rear end. This section cooperates with a similarly configured section that is formed by the upper surface of the rear part of the body 24. It should be noted that these two surfaces define a gap 66 between them which opens through the rear of the body. The cooling air which has been admitted through the inlets 62 and passes across the heat exchanger 63 and 65 and across the engine 33 and transmission 35 is all extracted through this rearwardly facing opening. As a result, there is extremely smooth air flow through the engine compartment and the wind resistance and drag coefficient of the vehicle is maintained at an extremely low level.

It should be noted that the portion of the body rearwardly of the driver's compartment and rearwardly of the bulkhead 54 around the engine 33 is provided with a generally vertically upwardly opening 67. The opening 67 permits air flow to or from the engine compartment 48 depending upon other aerodynamic conditions. The engine 33, as aforenoted, is of the V type and has an induction system comprising vertically upwardly extending ram tubes. The ram tubes communicate with an air inlet device, which may include an air filter and air silencing system and which is identified generally by the reference numeral 68. It should be noted that the roof line of the vehicle falls off abruptly adjacent the opening 67 and the air inlet device 68 is covered by a cover panel 69 which acts to form an extension of the body so as to permit air flow. In this way, the drag of the vehicle is not adversely affected.

The tuning of the exhaust systems for conventional rear or mid-engine vehicles causes considerable problems. The reason for this is that there is an optimum length for good high performance, the length being considered as the distance from the exhaust port to the atmospheric air discharge. Since the engine is placed so far to the rear, it is not possible to use long exhaust systems as in front engine vehicles. As a result, many rear engine vehicles either do not develop the same power as if they were placed in a forward location or, alternatively, have complicated and circuitous exhaust pipes that extend rearwardly from the engine. In accordance with a feature of the invention, the vehicle 21 has a long effective length for its exhaust system but this is done by means of a very simple arrangement.

Figure 10:
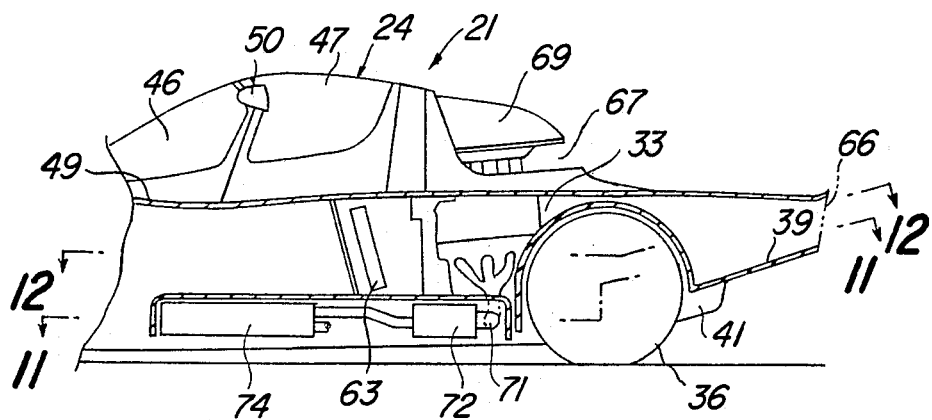
FIG. 10 is a partial cross-sectional view taken along the line 10—10 of FIG. 6.
Figure 11:
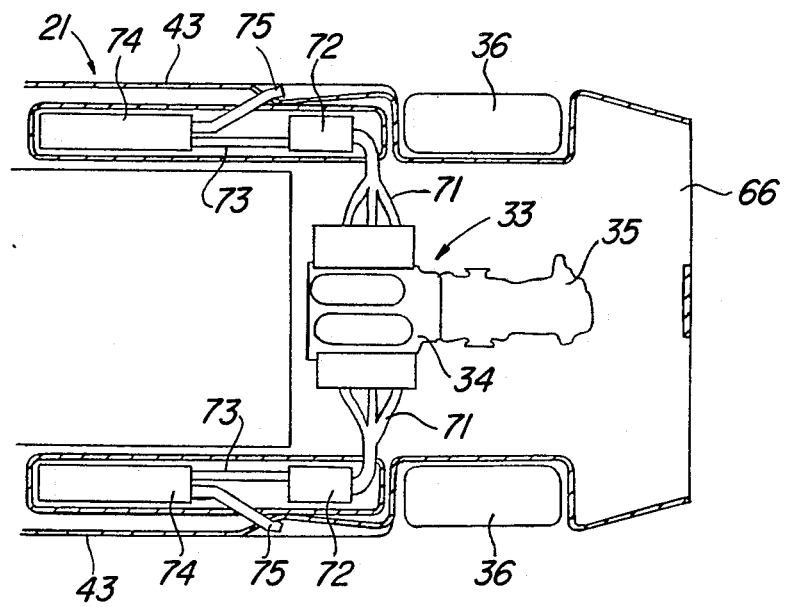
FIG. 11 is a cross-sectional view taken along the line 11—11 of FIG. 10.

Referring primarily to FIGS. 10 and 11, it will be noted that each back of the engine is provided with a respective exhaust manifold 71. The exhaust manifolds 71 have forwardly extending discharge portions that extend into catalytic converters 72 that lie along the sides of the vehicle 21 at a relatively low position in the body 24 and ahead of the rear wheels 36. From the catalytic converters 72, there is provided a forwardly extending exhaust pipe 73 at each side that delivers exhaust gases to a respective muffler 74 that lies under the air inlet openings 62 at the respective vehicle side. The mufflers 74 are of the reverse flow type and tail pipes 75 extend from the outlet ends of the mufflers 74 rearwardly and discharge through openings in the side of the vehicle forwardly of the rear wheels 36. As a result of the forward and reverse flow of the exhaust gases, it is possible to provide a considerable effective length for the exhaust system while, at the same time, minimizing the number of bends and turns required. Furthermore, the rear end of the car is not cluttered with the exhaust system and the transmission will not be heated by the exhaust gases. Also, since the exhaust components are positioned forwardly and in a cool area, there will be heat problems associated with them. In the illustrated embodiment, the combination of a catalytic converter and muffler are employed. It is to be understood that other arrangements of exhaust treatment devices (mufflers, converters and/or expansion chambers) may be employed with this placement.

It should be readily apparent from the foregoing description that an extremely effective motor vehicle has been provided which has extremely good aerodynamics, good directional stability, will comply with local vehicle codes insofar as bumper heights, etc., and which has a very effective exhaust system even though a rear or mid-engine layout is provided.

The foregoing description is that of a preferred embodiment of the invention and it is to be understood that various changes and modifications may be made without departing from the spirit and scope of the invention, as defined by the appended claims.

I claim:

1. A motor vehicle body for a vehicle having a pair of front wheels and a pair of rear wheels, said body comprising a pair of fenders each extending generally rearwardly from the front of said vehicle, over one of said front wheels, over the rear wheel at the respective side and terminating at the rear of said vehicle, a central body portion extending from the front to the rear of said vehicle and defining a front portion, a passenger compartment, and engine compartment behind said passenger compartment and a rear end, and joining portions joining central body portion to said fenders, said joining portions being concave in transverse cross-section from the front of the rear of said body to define a pair of continuous front to a rear air flow channels lying below the tops of said fenders, the front of said fenders being substantially higher than the front of said central body portion and further including a bridging section fixed to the front portions of said fenders and extending transversely across said central body portion and above the adjacent part of said central body portion for defining an air inlet opening below said bridging section and above said central body portion.

2. A motor vehicle as set forth in claim 1 wherein the front bridging section is of sufficient height to service as a bumper and mounts a license plate.

3. A motor vehicle body for having a pair of front wheels and a pair of rear wheels, said body comprising a pair of fenders each extending generally rearwardly from tea front of said vehicle, over one of said front wheels, over the rear wheel at the respective side and terminating at the rear of said vehicle, a central body portion extending from the front to the rear of said vehicle and defining a front portion, a passenger compartment, an engine compartment behind said passenger compartment and a rear end, joining portions being concave in transverse cross-section to define a pair of front to rear air flow channels lying below the tops of said fenders, the front of said fenders being substantially higher than the front of the body portion, a bridging section extending transversely across said central body portion between the fronts of said fenders and defining an air inlet opening between said bridging section and said central body portion, said front bridging section being of adequate height to comply with bumper requirements, a license plate mounted on said bridging section, said license plate terminating above said central body portion, and an aerodynamic member positioned on said body below said license plate for eliminating turbulence in the air flow thereacross.

4. A motor vehicle as set forth in claim 3 wherein the air flow channels defined by the joining portions are deeper at the front of the vehicle than at the rear.

5. A motor vehicle as set forth in claim 4 wherein the depth of the channels generally tapers to the rear of the vehicle.

6. A motor vehicle body for a vehicle having a pair of front wheels and a pair of rear wheels, said body comprising a pair of fenders each extending generally rearwardly from the front of said vehicle, over one of said front wheels, over the rear wheel at the respective side and terminating at the rear of said vehicle, a central body portion extending from the front to the rear of said vehicle and defining a front portion, a passenger compartment, an engine compartment behind said passenger compartment and a rear end, and joining portions joining central body portion to said fenders, said joining portions being concave in transverse cross-section from the front of the rear of said body to define a pair of continuous front to rear air flow channels lying below the tops of said fenders, said passenger compartment being defined at least in part by a roof formed by said central body portion and ended at its rear end by a generally vertically extending wall defining the forward extent of an opening formed in the body above the engine compartment.

7. A motor vehicle as set forth in claim 6 wherein an engine in the engine compartment has an air inlet device extending upwardly through the opening and including a member fixed relative thereto and defining an aerodynamically continuous transition from the roof of the vehicle to the rear end thereof.

8. A motor vehicle body for a vehicle having a pair of front wheels and a pair of rear wheels, said body comprising a pair of fenders each extending generally rearwardly from the front of said vehicle, over one of said front wheels, over the rear wheel at the respective side and terminating at the rear of said vehicle, a central body portion extending from the front to the rear of said vehicles and defining a front portion, a passenger compartment, an engine compartment to the rear of said passenger compartment and rear end, joining portions joining said central body portion to said fenders, said joining portions being concave in transverse cross-section to define a pair of front to rear air flow channels lying below the tops of said fender, an engine in said engine compartment, and an exhaust system for said engine comprising an exhaust manifold discharging forwardly and at one side of vehicle, an exhaust device extending along the side of the vehicle adjacent the passenger compartment and having an inlet opening in a rear face of said exhaust device and an outlet opening in said rear face, and a tailpipe extending rearwardly from said outlet opening of said exhaust device.

9. A motor vehicle as set forth in claim 8 wherein the exhaust device lies forwardly of the rear wheels.

10. A motor vehicle body for a vehicle having a pair of front wheels and a pair of rear wheels, said body comprising a pair of fenders each extending from tea front of said vehicle, over one of said front wheels, over the rear wheel of the respective side and terminating at the rear of said vehicle, a central body portion extending from the front to the rear of said vehicle and defining a front portion, a passenger compartment, and a rear end, said fenders having a portion at one end of said vehicle that extends a substantially greater height than the adjacent part of said central body portion, and a bridging section joined to and extending between said fenders at said one end and lying above said central body portion adjacent part to define an air gap therebetween.

11. A motor vehicle body as set forth in claim 10 wherein the bridging section has a wing like configuration.

12. A motor vehicle body as set forth in claim 11 wherein the bridging section includes means for mounting a license plate therefrom.

13. A motor vehicle body as set forth in claim 12 further including a flow device positioned beneath the license plate for preventing turbulent flow thereacross.

14. A motor vehicle body as set forth in claim 10 wherein the bridging section lies at the front of the vehicle.

15. A motor vehicle body as set forth in claim 14 wherein the bridging section has a wing like configuration.

16. A motor vehicle as set forth in claim 15 wherein the bridging section includes means for mounting a license plate therefrom.

17. A motor vehicle body as set forth in claim 16 further including a flow device positioned beneath the license plate for preventing turbulent flow thereacross.

18. A motor vehicle body for a vehicle having a pair of front wheels and a pair of rear wheels, said body comprising a pair of fenders each extending generally from the front of said vehicle, over one of said front wheels, over the rear wheel at the respective side and terminating at the rear of said vehicle, a central body portion extending from the front to the rear of said vehicle and defining a front portion, a passenger compartment, an engine compartment behind said passenger compartment and a rear end, said engine being defined by said central body portion and an under tray having parallelly extending rearward portions that define the upper and lower extremities of a rearwardly opening extraction opening for permitting air flow from the engine compartment rearwardly.

19. A motor vehicle body as set forth in claim 18 further including at least one air inlet opening for the engine compartment formed in at least one side of the vehicle.

20. A motor vehicle body as set forth in claim 19 further including a cooling heat exchanger extending at least in part across the air inlet opening.

21. A motor vehicle body as set forth in claim 20 wherein the heat exchanger receives engine coolant for cooling the engine.

22. A motor vehicle body as set forth in claim 21 wherein the heat exchanger receives engine lubricant for cooling the lubricant.

23. A motor vehicle body as set forth in claim 22 further including an air inlet opening in each side of the vehicle and a cooling radiator extending across the other inlet opening and receiving coolant from the engine.

24. A motor vehicle body for a vehicle having a pair of front wheels and a pair of rear wheels, said body comprising a pair of fenders each extending from the front of said vehicle, over one of said front wheels, over the rear wheel at the respective side and terminating at the rear of said body, a central body portion extending from the front to the rear of said vehicle and defining a front portion, a passenger compartment, an engine compartment and a rear end, an engine contained within said engine compartment and having an exhaust manifold terminating in a forwardly extending outlet, an exhaust device lying at one side of said vehicle forwardly of said rear wheel and having a rearwardly facing inlet opening and a rearwardly facing outlet opening, an exhaust pipe communicating said exhaust manifold with said exhaust device inlet, and a tailpipe communicating said exhaust device outlet with the atmosphere at one side of said vehicle and forwardly of one of said rear wheels.

25. A motor vehicle body as set forth in claim 24 wherein the engine is of the V type and there is an exhaust manifold and exhaust device at each side of the vehicle.

* * * * *

UNITED STATES PATENT AND TRADEMARK OFFICE
CERTIFICATE OF CORRECTION

| | |
|---|---|
| PATENT NO. : | 4,966,408 |
| DATED : | October 30, 1990 |
| INVENTOR(S) : | Takuya Yura |

It is certified that error appears in the above-identified patent and that said Letters Patent is hereby corrected as shown below:

On the Title Page under "Foreign Application Priority Data", insert:
--Jan. 9, 1987 [JP] .... 62-1884--
--Jan. 9, 1987 [JP] .... 62-1885--

Column 7, line 63, Claim 1, delete "a".

Column 9, line 21, Claim 10, "tea" should be --the--.

Column 10, line 8, Claim 18, after "engine" insert --compartment--.

Column 10, line 24, Claim 22, "21" should be --20--.

Signed and Sealed this

Sixteenth Day of March, 1993

Attest:

STEPHEN G. KUNIN

*Attesting Officer*   *Acting Commissioner of Patents and Trademarks*